United States Patent [19]
Bodtker

[11] Patent Number: 5,762,162
[45] Date of Patent: Jun. 9, 1998

[54] ELECTRIC POWER STEERING APPARATUS

[75] Inventor: Joen Christen Bodtker, Flint, Mich.

[73] Assignee: General Motors Corporation, Detroit, Mich.

[21] Appl. No.: 576,924

[22] Filed: Dec. 22, 1995

[51] Int. Cl.$^6$ ............................................. B62D 5/04
[52] U.S. Cl. ..................... 180/444; 475/339; 74/665 B
[58] Field of Search ........................... 475/338, 339, 475/342, 329, 330; 74/665 A, 665 B, 388 PS; 180/444, 443

[56] References Cited

U.S. PATENT DOCUMENTS

| | | |
|---|---|---|
| 4,530,413 | 7/1985 | Buike et al. |
| 4,765,425 | 8/1988 | Saito et al. ............................ 180/444 |
| 4,862,982 | 9/1989 | Saito et al. |
| 4,881,611 | 11/1989 | Nakashima et al. |
| 4,932,492 | 6/1990 | Sauvageot et al. ..................... 180/446 |
| 4,934,473 | 6/1990 | Fushimi et al. |
| 5,086,859 | 2/1992 | Takahashi et al. |
| 5,226,498 | 7/1993 | Gutkowski et al. |
| 5,230,397 | 7/1993 | Tranchon ............................. 180/79.1 |
| 5,333,700 | 8/1994 | Mouri .................................. 180/79.1 |
| 5,435,794 | 7/1995 | Mori et al. ............................ 475/343 |

Primary Examiner—Brian L. Johnson
Assistant Examiner—Avraham Lerner
Attorney, Agent, or Firm—Saul Schwartz

[57] ABSTRACT

A shaft assist electric power steering apparatus including an electric motor and a speed reducer having an input planetary gear set and an output planetary gear set each concentric with a steering shaft. The input planetary gear set includes an input ring gear, an input sun gear, a stationary input planet carrier, and a plurality of input planet pinions one of which is driven by the electric motor. The output planetary gear set includes an output sun gear rigidly connected to the input sun gear, an output ring gear rigidly connected to the input ring gear, an output planet carrier rigidly connected to the steering shaft, and a plurality of output planet pinions. The driven input planet pinion rotates the input sun gear and the input ring gear in opposite directions and, likewise, the output sun gear and the output ring gear. When the pitch diameter of one of the output sun gear and the output ring gear is different from the pitch diameter of the input sun gear and the input ring gear, respectively, the output planet carrier rotates to compensate for the speed difference between input planet pinions and the output planet pinions.

7 Claims, 2 Drawing Sheets

ELECTRIC POWER STEERING APPARATUS

FIELD OF THE INVENTION

This invention relates to electric power steering for motor vehicles.

BACKGROUND OF THE INVENTION

A driver normally steers a motor vehicle by applying manual effort to a steering wheel mounted on the end of a steering shaft rotatably supported on a steering column. The steering shaft is typically connected to steered wheels of the motor vehicle through a steering gear having an input shaft rotatable with the steering shaft and an output element such as a rack bar or pitman arm linked to the steered wheels. Electric power steering apparatus commonly referred to as "shaft assist" includes an electric motor and a speed reducer connected to the electric motor and to the steering shaft or to the steering gear input shaft. A known shaft assist electric power steering apparatus includes an electric motor mounted in cantilever fashion on the steering column, a worm shaft driven by the electric motor, and a worm gear on the steering shaft meshing with the worm shaft. The speed reducer in that apparatus achieves an acceptable reduction ratio in a small package but has low mechanical efficiency due to friction at the sliding interface between the worm shaft and the worm gear, requires lash adjustment at the gear mesh, and may be noisy due to structure borne vibration. In another known shaft assist electric power steering apparatus, a speed reducer includes a planetary gear set concentric with the steering shaft having a sun gear driven by the electric motor, a stationary ring gear, and a planet carrier connected to the steering shaft. The speed reducer in that apparatus becomes unacceptably large for motor vehicle applications when constructed to achieve reduction ratios comparable to speed reducers having worm gears.

SUMMARY OF THE INVENTION

This invention is a new and improved shaft assist electric power steering apparatus including an electric motor and a speed reducer having an input planetary gear set and an output planetary gear set each concentric with a steering shaft. The input planetary gear set includes an input ring gear and an input sun gear each concentric with the steering shaft, a stationary input planet carrier, and a plurality of input planet pinions rotatably supported on the input planet carrier meshing with the input sun and input ring gears. One of the input planet pinions is connected to and driven by the electric motor. The output planetary gear set includes an output sun gear concentric with the steering shaft and rigidly connected to the input sun gear, an output ring gear concentric with the steering shaft and rigidly connected to the input ring gear, an output planet carrier rigidly connected to the steering shaft, and a plurality of output planet pinions rotatably supported on the output planet carrier meshing with the output sun and output ring gears. When the electric motor is on, the driven input planet pinion rotates the input sun gear and the input ring gear in opposite directions and, likewise, the output sun gear and the output ring gear. The output sun gear and output ring gear, in turn, rotate the output planet pinions in the same direction as the input planet pinions. When the pitch diameter of at least one of the output sun gear and the output ring gear is different from the pitch diameter of the input sun gear and the input ring gear, respectively, the speed of rotation of the output planet pinions is different from the speed of rotation of the input planet pinions. In that circumstance, the output planet carrier rotates about the centerline of the output torque of the steering shaft, and the electric motor is applied to the steering shaft at a reduction ratio equal to the ratio of the speed of rotation of the driven input planet pinion to the speed of rotation output planet carrier.

DESCRIPTION OF A PREFERRED EMBODIMENT

Figure 1:
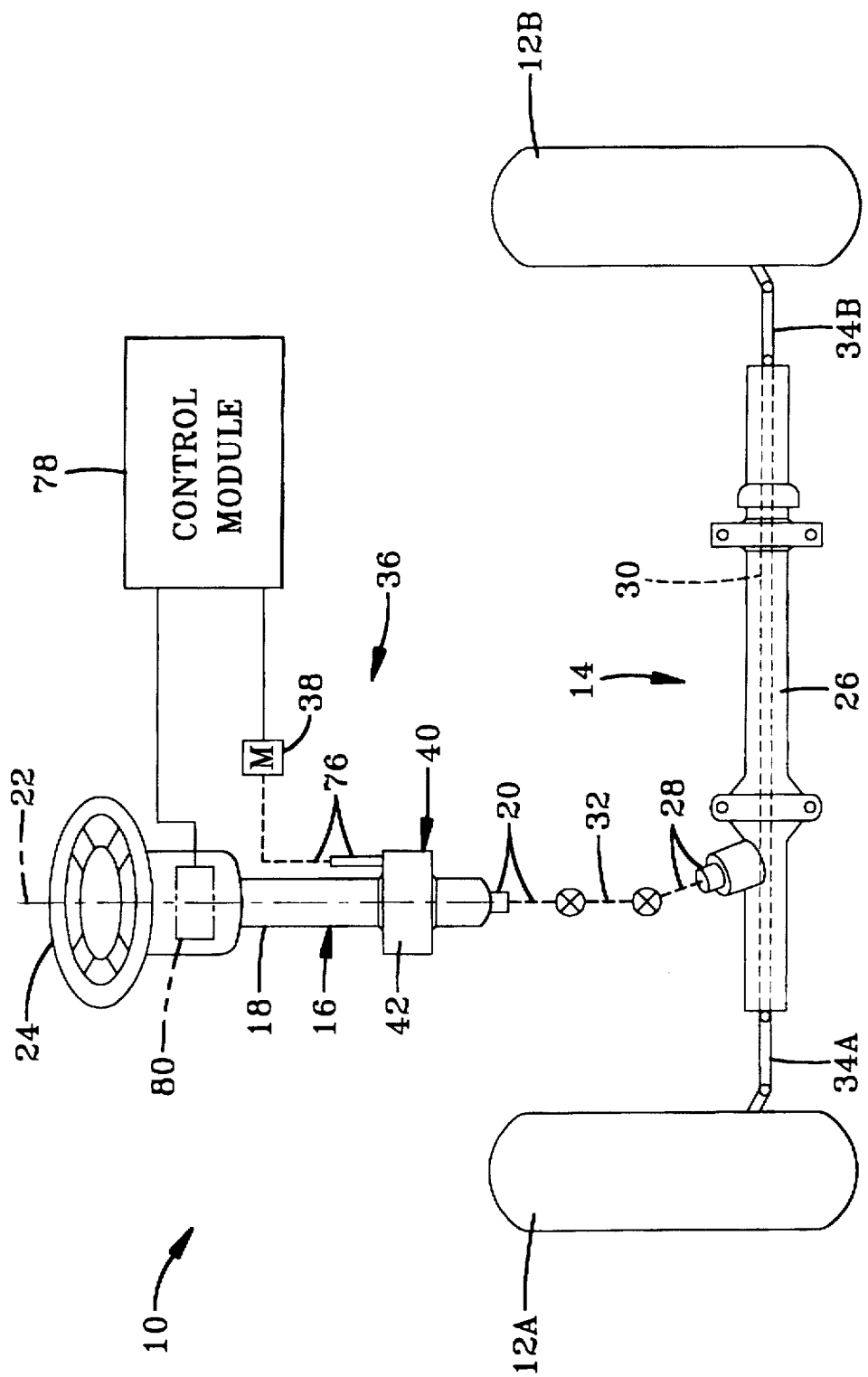
FIG. 1 is a fragmentary, schematic view of a motor vehicle having a shaft assist electric power steering apparatus according to this invention.

Referring to FIG. 1, a fragmentarily illustrated motor vehicle 10 includes a pair of steerable road wheels 12A,12B, a rack and pinion steering gear 14, and a steering column 16. The steering column 16 includes a mast jacket 18 rigidly supported on body structure, not shown, of the motor vehicle, a steering shaft 20 supported on the mast jacket for rotation about a centerline 22 of the steering column, and a steering wheel 24 rigidly connected to the steering shaft at the top of the steering column. The steering gear 14 includes a housing 26, a pinion shaft 28 rotatably supported on the housing 26, a rack bar 30 supported on the housing 26 for linear translation generally perpendicular to the pinion shaft 28, and rack and pinion gears, not shown, inside of the housing 26 which convert rotation of the pinion shaft 28 into lateral translation of the rack bar 30.

The pinion shaft 28 is connected to the steering shaft 20 for rotation therewith by an intermediate steering shaft 32. Opposite ends of the rack bar 30 are linked to the steerable wheels 12A,12B by a pair of tie rods 34A,34B. Manual effort applied by a driver at the steering wheel 24 rotates the steering shaft 20 and the pinion shaft 28 against resistance developed at the steerable wheels 12A,12B and transferred to the rack bar 30 through the tie rods 34A,34B. Manual effort applied at the steering wheel 24 is supplemented by a shaft assist electric power steering apparatus 36 according to this invention.

Figure 2:
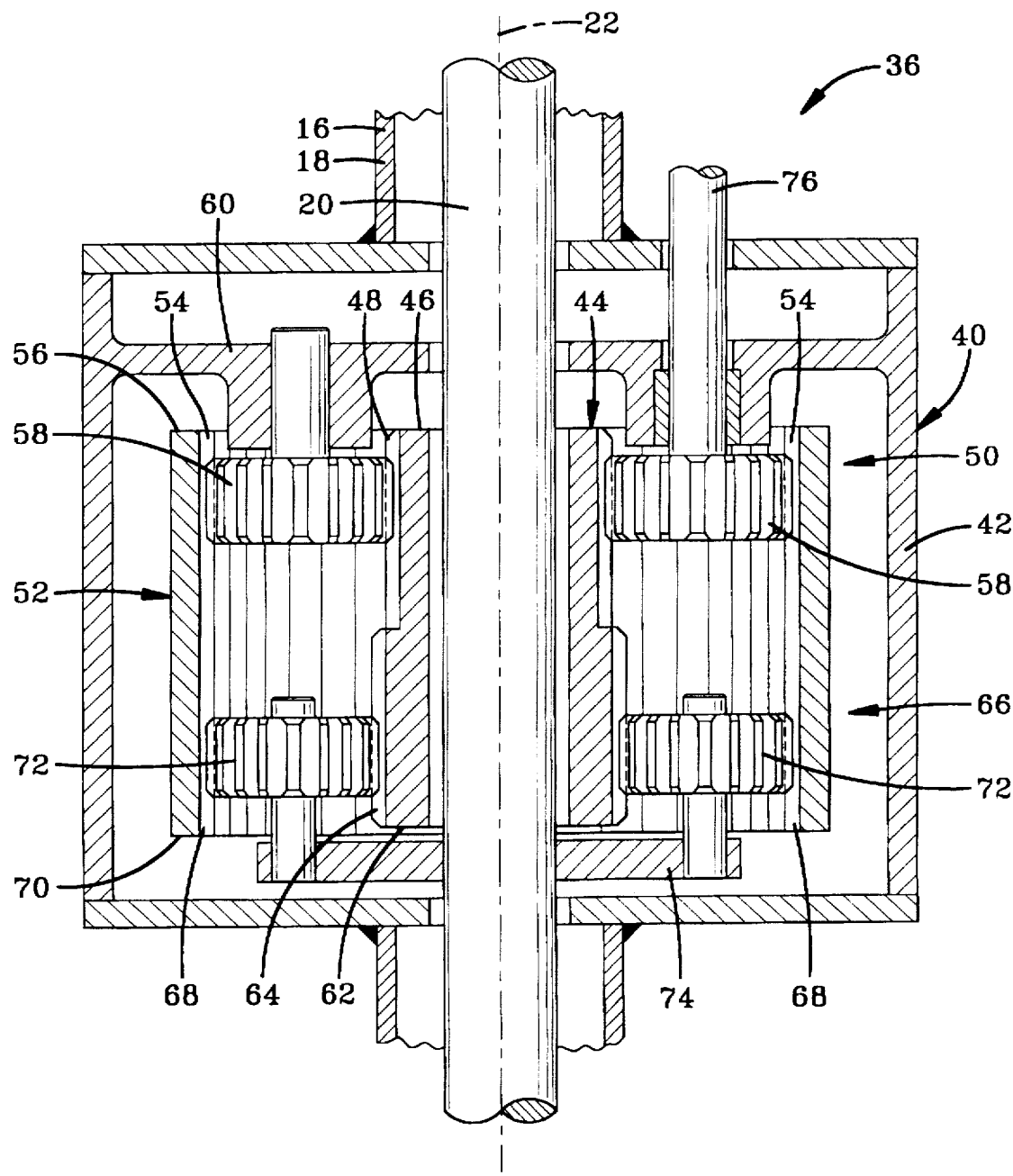
FIG. 2 is a schematic sectional view in plan of a speed reducer of the shaft assist electric power steering apparatus according to this invention.

The electric power steering apparatus 36 according to this invention is schematically illustrated in FIGS. 1–2 and includes an electric motor 38 and a speed reducer 40 having a stationary housing 42 rigidly attached to the mast jacket 18. A tubular inner sleeve 44 surrounds the steering shaft 20 inside the housing 42 and has a plurality of outside gear teeth adjacent a first end 46 constituting an input sun gear 48 of an input planetary gear set 50 of the speed reducer. A tubular outer sleeve 52 surrounds the steering shaft 20 and the tubular inner sleeve 44 inside the housing 42 and has a plurality of inside gear teeth which extend the full length of the outer sleeve and which constitute an input ring gear 54 of the input planetary gear set 50 adjacent a first end 56 of the outer sleeve. A plurality of input planet pinions 58 are symmetrically arrayed around the steering shaft 20 between and meshing with each of the input sun gear 48 and the input ring gear 54. Each of the input planet pinions 58 is rotatably supported on an integral web of the housing 42 which thus constitutes a stationary input planet carrier 60 of the input planetary gear set 50.

The tubular inner sleeve 44 has a plurality of outside gear teeth adjacent a second end 62 of the inner sleeve constituting an output sun gear 64 of an output planetary gear set 66 of the speed reducer 40. The inside gear teeth on the tubular outer sleeve 52 constitute an output ring gear 68 of the output planetary gear set 66 adjacent a second end 70 of the tubular outer sleeve. A plurality of output planet pinions 72 are symmetrically arrayed around the steering shaft 20 between and meshing with the output sun gear 64 and the output ring gear 68. Each of the output planet pinions 72 is rotatably supported on an output planet carrier 74 of the output planetary gear set 66. The output planet carrier 74 is rigidly connected to the steering shaft 20.

The electric motor 38 drives one of the input planet pinions 58 in either of two opposite directions, i.e. clockwise or counterclockwise, through a drive shaft 76. Remote mounting of the electric motor 38 relative to the steering column 16 minimizes structure bore noise attributable to the electric motor. A control module 78 is connected to a transducer 80 on the steering column 16 and to the electric motor 38. Energy to operate the electric motor 38 is derived from the electrical system of the motor vehicle in conventional fashion. The control module 78 establishes the speed and direction of rotation of the electric motor 38 in accordance with a signal from the transducer 80 corresponding to the direction and magnitude of manual effort applied at the steering wheel 24.

When the electric motor is on, the driven one of the input planet pinions 58 rotates the input sun gear 48 and the input ring gear 54 in opposite directions about the longitudinal centerline 22 of the steering column. The non-driven ones of the input planet pinions 58 function as simple idlers and contribute to maintenance of concentricity between the tubular inner sleeve 44 and the tubular outer sleeve 52. Further, since the output sun gear 64 and output ring gear 68 are integral with the input sun gear 48 and input ring gear 54, respectively, the output sun gear and output ring gear rotate in the same direction and at the same speed as the input sun gear and the input ring gear and, in turn, rotate each of the output planet pinions 72 in the same direction of rotation as the input planet pinions 58.

If the pitch diameter of at least one of the output sun gear 64 and output ring gear 68 is different from the pitch diameter of the input sun gear 48 and the input ring gear 54, respectively, the speed of rotation of the output planet pinions 72 will be different from the speed of rotation of the input planet pinions 58. In that circumstance, the output planet carrier 74 rotates about the longitudinal centerline 22 of the steering column to compensate for the speed difference between the input and output planet pinions. The overall gear ratio of the speed reducer 40 is the ratio of the speed of rotation of the driven one of the input planet pinions 58 to the speed of rotation of the output planet carrier 74 and is defined by the following equation:

where: $\omega_{co}$=speed of rotation of output planet carrier 74
$\omega_{pi}$=speed of rotation of driven input planet pinion 58
$r_{pi}$=pitch radius of input planet pinion 58
$r_{ro}$=pitch radius of output ring gear 68
$r_{ri}$=pitch radius of input ring gear 54
$r_{so}$=pitch radius of output sun gear 64
$r_{si}$=pitch radius of input sun gear 48
$r_{co}$=radius of output planet carrier 74

In accordance with the above equation, for example, a compact speed reducer having a reduction ratio equal to about 21:1 can be constructed from 48 diametral pitch spur gears having the following number of gear teeth:
Input sun gear: 48 teeth
Input planet pinions: 48 teeth
Input ring gear: 144 teeth
Output sun gear: 56 teeth
Output planet pinions: 42 teeth
Output ring gear: 140 teeth
Output planet carrier: 98 teeth*

*The output planet carrier 74 does not have teeth but has a diameter corresponding to the pitch diameter of a 48 diametral pitch spur gear having 98 teeth.

In operation, when a driver applies manual effort to the steering wheel 24 to steer the motor vehicle, the transducer 80 provides a signal to the control module 78 corresponding to the direction and magnitude of the applied effort. The control module 78 turns the electric motor 38 on in a direction and at a speed corresponding to the magnitude and direction of the applied manual effort. Output torque of the electric motor 38 is multiplied by the speed reducer and applied to the steering shaft 20 through the output planet carrier 74 to supplement the driver's manual effort applied at the steering wheel 24. The control module may receive signals from additional transducers, e.g. a vehicle speed sensor, to control the electric powering steering apparatus 36 in accordance with a combination of manual effort applied at the steering wheel 24 and additional variables, e.g. vehicle speed.

I claim:

1. A shaft assist electric power steering apparatus for a motor vehicle having a steering shaft with a steering wheel thereon rotatable about a longitudinal centerline of a steering column of said motor vehicle including
   an electric motor, and
   a mechanical speed reducer connected to said electric motor and to said steering shaft for applying the output torque of said electric motor to said steering shaft,
   characterized in that said mechanical speed reducer comprises:
      an input planetary gear set consisting of an input sun gear and an input ring gear each rotatable about said longitudinal centerline of said steering column and a plurality of input planet pinions each rotatably supported on an input planet carrier of said input planetary gear set and meshing with each of said input sun gear and said input ring gear,
      means rigidly connecting said input planet carrier to said steering column to prevent rotation of said input planet carrier about said longitudinal centerline of said steering column,
      means connecting said electric motor to one of said plurality of input planet pinions so that said one input planet pinion rotates said input sun gear and said input ring gear in opposite directions when said electric motor is on,
      an output planetary gear set consisting of an output sun gear rigidly connected to said input sun gear and an output ring gear rigidly connected to said input ring gear each rotatable about said longitudinal centerline of said steering column and a plurality of output planet pinions each rotatably supported on an output planet carrier of said output planetary gear set and meshing with each of said output sun gear and said output ring gear,
         the pitch diameter of one of said output sun gear and said output ring gear being different than the pitch diameter of the corresponding one of said input sun gear and said input ring gear so that said output planet carrier rotates about said longitudinal centerline of said steering column in response to rotation of said one input planet pinion, and
      means rigidly connecting said output planet carrier to said steering shaft.

2. The shaft assist electric power steering apparatus recited in claim 1 wherein said mechanical speed reducer further comprises:

a tubular inner sleeve concentric with said steering shaft having a plurality of outside gear teeth at a first end thereof constituting said input sun gear of said input planetary gear set and a plurality of outside gear teeth at a second end thereof constituting said output sun gear of said output planetary gear set, and a tubular outer sleeve concentric with said steering shaft and with said tubular inner sleeve having a plurality of inside gear teeth at a first end thereof constituting said input ring gear of said input planetary gear set and a plurality of inside gear teeth at a second end thereof constituting said output ring gear of said output planetary gear set.

3. The shaft assist electric power steering apparatus recited in claim 2 wherein:

said electric motor is mounted on said motor vehicle remote from said mechanical speed reducer.

4. The shaft assist electric power steering apparatus recited in claim 3 wherein said mechanical speed reducer further comprises:

a housing rigidly connected to said steering column, and a stationary web in said housing having each of said input planet pinions rotatably supported thereon and constituting said input planet carrier.

5. A speed reducer between a drive shaft rotatable about a first centerline and a driven shaft rotatable about a second centerline parallel to the first centerline comprising:

an input planetary gear set consisting of an input sun gear and an input ring gear each rotatable about said second centerline and a plurality of input planet pinions each supported on an input planet carrier of said input planetary gear set for rotation about a respective one of a plurality of input planet pinion centerlines parallel to said second centerline and meshing with each of said input sun gear and said input ring gear, means operative to prevent rotation of said input planet carrier about said second centerline, means rigidly connecting said drive shaft to one of said plurality of input planet pinions so that said input planet pinion centerline of said one input planet pinion constitutes said first centerline and said one input planet pinion rotates said input sun gear and said input ring gear in opposite directions when said drive shaft rotates about said first centerline, an output planetary gear set consisting of an output sun gear rigidly connected to said input sun gear and an output ring gear rigidly connected to said input ring gear each rotatable about said second centerline and a plurality of output planet pinions each rotatably supported on an output planet carrier of said output planetary gear set and meshing with each of said output sun gear and said output ring gear, the pitch diameter of one of said output sun gear and said output ring gear being different than the pitch diameter of the corresponding one of said input sun gear and said input ring gear so that said output planet carrier rotates about said second centerline in response to rotation of said one input planet pinion, and means rigidly connecting said output planet carrier to said driven shaft.

6. The speed reducer recited in claim 5 further comprising:

a tubular inner sleeve concentric with said second centerline having a plurality of outside gear teeth at a first end thereof constituting said input sun gear of said input planetary gear set and a plurality of outside gear teeth at a second end thereof constituting said output sun gear of said output planetary gear set, and a tubular outer sleeve concentric with said second centerline and with said tubular inner sleeve having a plurality of inside gear teeth at a first end thereof constituting said input ring gear of said input planetary gear set and a plurality of inside gear teeth at a second end thereof constituting said output ring gear of said output planetary gear set.

7. The speed reducer recited in claim 6 further comprising:

a housing around each of said planetary gear set and said output planetary gear set, and a stationary web in said housing having each of said input planet pinions rotatably supported thereon and constituting said input planet carrier.

* * * * *